Figure 1:
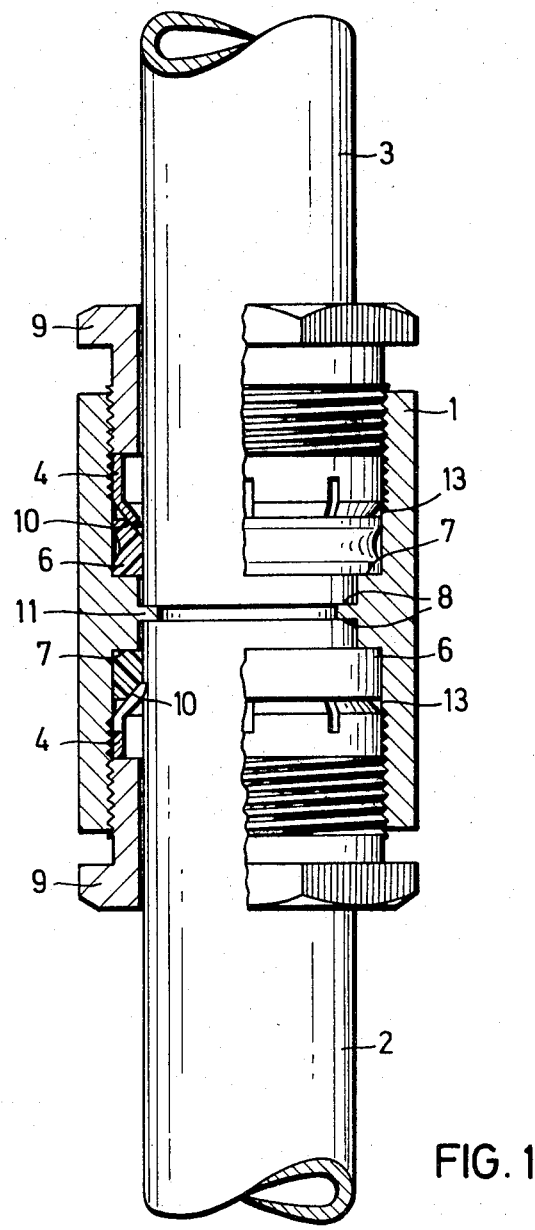

United States Patent

Hoffmann

[15] 3,679,241
[45] July 25, 1972

[54] COMPRESSION PIPE COUPLING
[72] Inventor: Ernst Hoffmann, Braunlage, Germany
[73] Assignee: Schmidt, Kranz & Co. GmbH, Zorge, Sudharz, Germany
[22] Filed: June 3, 1970
[21] Appl. No.: 43,099

[30] Foreign Application Priority Data

June 11, 1969 Germany ..................P 19 29 516.0
Feb. 4, 1970 Germany ..................P 20 04 921.2
March 26, 1970 Germany ..................P 20 14 622.9

[52] U.S. Cl. ............................................285/340, 285/369
[51] Int. Cl. ..................................................F16l 17/00
[58] Field of Search ..........................................285/340, 369

[56] References Cited

UNITED STATES PATENTS

| | | | |
|---|---|---|---|
| 3,219,751 | 11/1965 | Pfendler et al. | 285/340 X |
| 2,158,757 | 5/1939 | Kuestermeier | 285/340 X |
| 3,434,744 | 3/1969 | Yoke et al. | 285/340 X |

FOREIGN PATENTS OR APPLICATIONS

| | | | |
|---|---|---|---|
| 392,171 | 9/1965 | Switzerland | 285/340 |
| 84,078 | 10/1964 | France | 285/340 |
| 929,100 | 6/1955 | Germany | 285/340 |
| 6,408,516 | 1/1965 | Netherlands | 285/340 |

*Primary Examiner*—Dave W. Arola
*Attorney*—Stevens, Davis, Miller & Mosher

[57] ABSTRACT

A compression type pipe coupling for connecting unthreaded pipes together or to a threaded pipe. A female threaded body has an annular collar upon which the end of the pipe rests, the pipe being held in place by an elastic plastic sealing ring, a frusto-conical washer and a male threaded sleeve which compresses the ring and washer.

6 Claims, 10 Drawing Figures

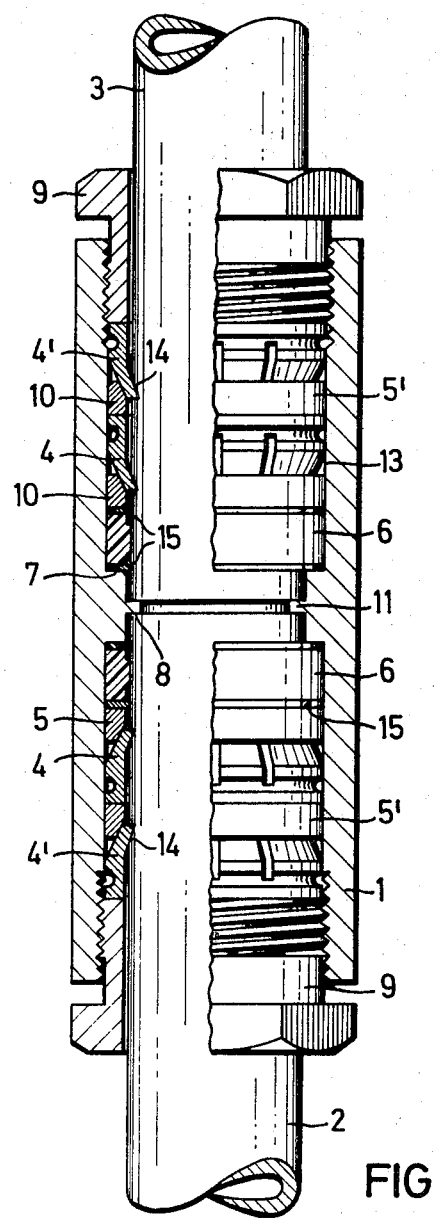
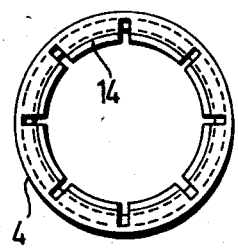
FIG. 9
FIG. 10

COMPRESSION PIPE COUPLING

The present invention relates to a pipe coupling sleeve consisting of a housing having at least two connecting ends, at least one connecting end having a clamp fastening for an unthreaded smooth pipe with means for sealing and clamping which hold the smooth pipe end fast by the action of the axial thrust of a pressure sleeve adapted to be screwed therein.

The object of the invention is to improve the construction and operation of the aforementioned coupling sleeve provided with means for sealing and clamping. The means for sealing and clamping are specially made in such a manner that upon the screwing in of the pressure sleeve, the sealing process is first of all carried out, whereupon a mechanical coupling is created which holds the pipe end fast against both tensile and compressive forces, and thereby contributes to the greatest possible protection of the seal.

The pipe coupling of this invention has the following characteristics:

Within the sleeve housing there is provided an annular stop surface in the form of a collar which serves to limit the penetration of the end face of the smooth pipe end into the coupling;

it has at least one elastic sealing ring of plastic and a clamping cap which are adapted to be clamped axially against each other in an annular space which lies in front of said stop surface between the cylindrical wall surfaces of the pipe and housing as well as an annular supporting surface adjacent the stop surface and an outer annular pressure sleeve;

the clamping cap has an inwardly directed conical end which is slit to form a crown shape and is adapted to be inserted into an internal cone formed laterally of the sealing ring and the resistance to elastic deformation of said cap is considerably greater than that of the sealing ring so that the slit end of the clamping cap, upon axial thrust of the pressure sleeve which has been screwed into the housing end, can, because of the clamping of the sealing ring, be forced by means of the radial pressure produced by the internal cone to clampingly engage the outer surface of the pipe end.

The coupling sleeve in accordance with this invention is suitable for the connecting of hot-rolled, seamless or welded pipes. Even pipes having corrosion pits can be tightly connected and sealed. It has been determined by experiments that in the case of pipes of a diameter of about 27 mm, the pipe coupling can withstand a pressure of about 1,200 atm.ga.

The elastic sealing ring of plastic is confined by the annular space between the cylindrical wall surfaces of the pipe and the housing as well as by the inner annular supporting surface adjacent the stop surface and the outer special clamping cap. Since the clamp cap has the higher resistance to deformation, the result is that the sealing ring is deformed in all directions and produces tight closure. Only then is the specially made clamping cap subjected, by means of the inner cone in the region of the slit inner end, to radial deformation; thus mechanical locking of the pipe is obtained with the claws forcing themselves into the cylindrical wall surface of the pipe end.

In the coupling sleeve of this invention, the annular stop surfaces serving to support the surface of the pipe end can be formed of a reduced diameter step on the inner wall of the housing.

Another advantageous construction of the coupling sleeve has, in the central region of the housing, a loosely inserted ring-like collar which spaces apart two adjacent coaxial annular spaces, the two face surfaces serving as stop surfaces. This annular collar is clamped between pipe ends which are directed coaxially against each other and it is made of steel or a metal which is sufficiently hard to withstand the compressive forces occurring. The two oppositely directed pipe ends are closely adjacent to each other and as a result of the displaceable arrangement of the collar, an equalization of the stresses exerted on the sealing and the clamping caps takes place in the adjacent annular spaces upon the clamping of the two pipe ends.

A construction having the aforementioned features of the invention and which is sufficient to meet lesser requirements has the sealing ring clamped within the annular space in the housing between an inner face of the annular space which is usually a supporting surface and the slit conical end of the clamping cap. The cap is pressed axially inward by the pressure sleeve, the inner cone which surrounds the conical end of the clamping cap being provided in the sealing ring.

A design adapted to meet higher requirements has, between the sealing ring and the conical end of the clamping cap, an approximately trapezoidally profiled, dimensionally stable pressure ring of steel or metal which forms a closure disc in the annular space. This pressure ring has an inner cone for grasping the end of the clamping cap. The sealing ring is substantially rectangular in profile and is acted on at the radially directed face sides by pressure surfaces which are also radially directed. The slit conical end of the clamping cap has, in the special pressure ring, an inner cone of stable form which presses the claws firmly onto the cylindrical surface of the inserted pipe.

In an improvement of the aforementioned construction, the sealing ring is arranged between the outer trapezoidally profiled pressure ring and an inner pressure ring of approximately square profile which rests against the end of the annular space. This inner pressure ring also forms a closure disc which is adapted to the radial dimension of the annular space. The sealing ring is thus clamped between two loose pressure rings which are accurately and precisely machined and exerts a very effective action on the plastic ring. This arrangement of the sealing ring between two pressure rings is particularly suitable for those sleeve-like housing which have in their central portion a loosely inserted, relatively thin collar.

A particularly advantageous coupling sleeve is one in which both ends of the plastic sealing ring which is in the annular space, there are arranged thin-walled deformable annular discs of steel or metal in dish or frustoconical shape, the width of the annular surface being somewhat greater than the radial width of the annular space.

In this case it is furthermore advantageous if the annular disc associated with the outer end side of the plastic sealing ring is arranged between the sealing ring and a pressure ring of trapezoidally-shaped cross-section.

It is also advantageous to use a second pressure ring in the region behind the seal in such a manner that one of the aforementioned annular discs is clamped between the end side of the sealing ring and a pressure ring of approximately square profile.

In this construction with the annular discs, the annular discs are deformable in such a manner that upon screwing in the pressure sleeve and the inward pushing of the clamping cap by means of the interposed outer pressure ring and the supporting surface provided on the inner end of the annular space or a pressure ring provided there, they can be pressed to form a seal against the end sides of the plastic sealing rings and on the edges against the cylindrical wall surfaces of pipe and housing. During the axial inward movement of the inwardly screwed pressure sleeves, the dish-shaped annular discs are deformed and place themselves in the manner of armorings against the ends of the sealing rings. In this way the mass or material of the sealing ring is enclosed in a chamber limited by the annular discs. No sealing material can flow out of this chamber formed by the armorings so that the condition of sealing and clamping is retained even if subject to considerable vibration.

Before the axial clamping of the sealing ring and of the annular discs and the clamping cap, these bodies have a sufficiently large radial clearance with respect to the diameter of the pipe end to be clamped so that the assembling of all parts and the insertion of the pipe ends can be easily effected.

A pipe coupling intended for particularly stringent requirements has in the annular space lying behind the pressure sleeve (between the sealing ring and the pressure sleeve) arranged, axially one behind the other, at least two similar clamping caps; and more particularly arranged with the interposition of a pressure ring having an inner-cone surface. In this connection, it is also advantageous if the adjacent clamping caps have a different resistance to deformation, that is, the clamping cap which at the time lies closer to the pressure sleeve has a greater resistance to deformation than the clamping cap closer to the sealing ring.

Figure 8:
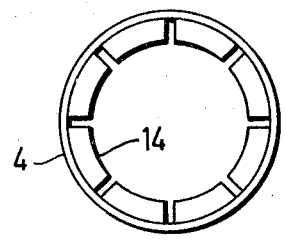

The pipe coupling is shown in various embodiments in the drawings in which:

FIGS. 1 to 7 and 9 each show a separate embodiment, substantially in longitudinal section;

FIGS. 8 and 10 each show a clamping cap in end view.

In all the embodiments shown in the drawings, a sleeve-like housing 1 is provided which has two connecting ends in which the end sections of the pipes 2 and 3 are fastened in the manner described below. In the case of this sleeve-like housing 1, the connecting ends may be arranged coaxially. The sleeve may also be L-shaped. It is also possible to provide the sleeves with more than two connecting ends (not shown in the drawings).

In connection with the sleeve-like housing, at least one connecting end should be provided with means for sealing and clamping which permit a dependable fastening of an unthreaded, i.e., smooth, pipe end. In the preferred embodiments, all connecting ends are provided in the same manner with the means for clamping smooth pipe ends. As means for the tight enclosing and clamping of smooth pipe ends at least the following bodies 4, 6, 9 arranged axially one behind the other in an annular space 13 of the pressure sleeve 9 which is adapted to be screwed into the connecting end, the clamping cap 4 and the sealing ring 6.

The outside diameter of the clamping cap corresponds approximately to the inside diameter of the annular space 13. The clamping cap has an inwardly directed conical end 14 slit in the manner of a crown, whereby projections are formed which surround the periphery of the pipe and can dig into the cylindrical wall. The sealing ring 6 which is preferably arranged indirectly behind the clamping cap 4 made of a plastic having elastic properties.

The inner end of the annular space 13 can have various types of end stops. In all cases, for support at the rear of the sealing ring there is an annular supporting surface 7 which is in relation to a stop surface 8 against which the side of the pipe near the end rests. The annular space is defined by the cylindrical wall surfaces of the inserted pipe 3 and the sleeve housing 1. By additional means, namely pressure rings 5 and 12 and further means described below, the connection can be improved. In order to obtain the inward squeezing of the projection of the clamping cap end 14, an inner cone 10 is provided in a manner which will be described below.

In the embodiment shown in FIG. 1, two pipe ends 2 and 3 which are coaxial with each other are fastened in two coaxial connecting ends of the housing 1. The central region of the housing has a collar 11 the two face sides of which form stop surfaces 8 for the pipe ends. Axially spaced from the stop surfaces 8 there are annular supporting surfaces 7 which at the same time form the end limitation of the annular chamber 13. The elastic plastic sealing ring 6 rests against the supporting surface 7. The length of the sealing ring is greater than its radial thickness. The outer frontside of the sealing ring has the shape of an inner cone 10. Upon the screwing in of the pressure sleeve 9, the plastic sealing ring is first compressed; thereupon the projections of the clamping cap are pressed by the inner cone 10 against or into the cylindrical surface of the pipe 2 or 3.

Figure 2:
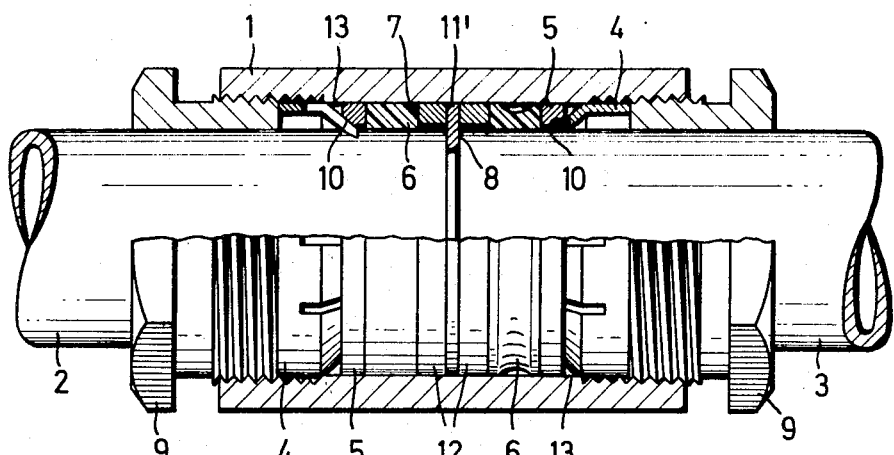

The construction shown in FIG. 2 has in the central region of the housing 1 a loosely inserted ring-like collar 11' of steel or metal of high compressive strength which serves to space apart two adjacent coaxial annular spaces 13, said collar at the same time forming stop surfaces 8 for the two pipe ends. Circumferentially with respect to the pipe ends there are arranged on both sides of the collar 11' metal pressure rings 12, which have an approximately square cross-section, the radial thickness of which corresponds approximately to the radial size of the annular space. The pressure rings 12 form the supporting surfaces 7 for the sealing rings which are to be held spaced from the pipe end.

Between the sealing ring and the clamping cap 4 there is provided a pressure ring 5 of steel or high compression metal of approximately trapezoidal cross-section, the outer side of which has the shape of the inner cone 10 and the radial thickness of which corresponds approximately to the radial dimension of the annular space 13. Upon the screwing in of the pressure sleeves 9, the stress conditions in the region of the two sealing rings 6 and of the clamping cap 4 are equalized via the axially movable collar 11'.

It should be noted that in FIGS. 1 and 2, the clamped condition has been shown with respect to one connecting end, while the condition before the clamping has been shown with respect to the other connecting end.

Figure 3:
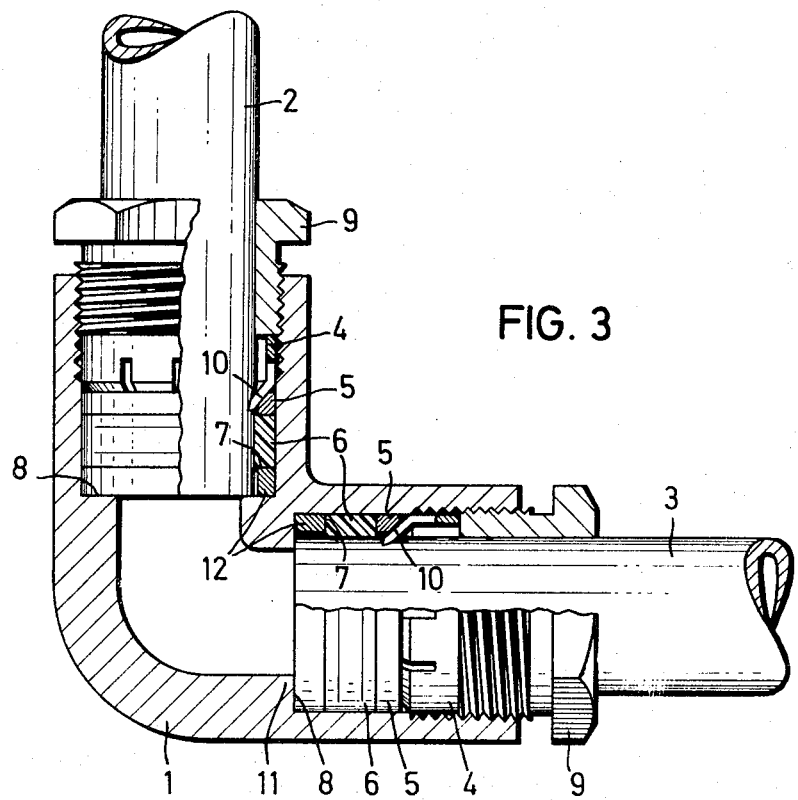

In a curved or L-shaped embodiment as illustrated in FIG. 3, the sleeve-like housing 1 and the stop surfaces 8 are formed in the manner of FIG. 1 by a housing collar 11. In the annular spaces 13 there are arranged in the same manner as in FIG. 2, behind the pressure sleeve 9, the clamping cap 4, a pressure ring 5, the sealing ring 6 and another pressure ring 12.

Figure 4:
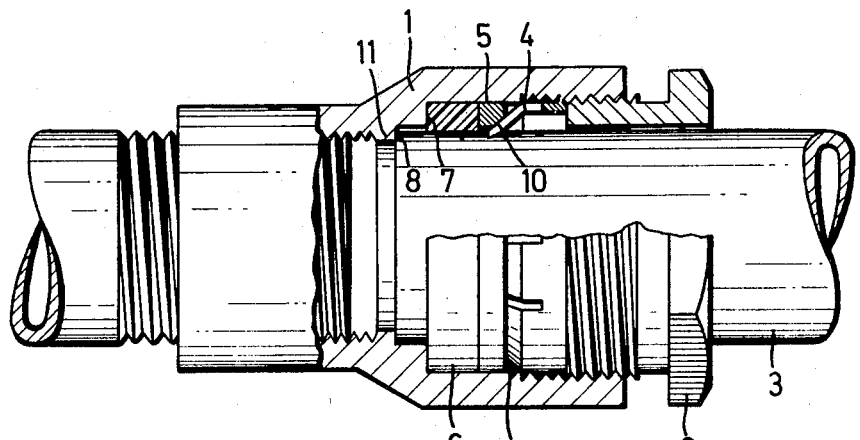
Figure 5:
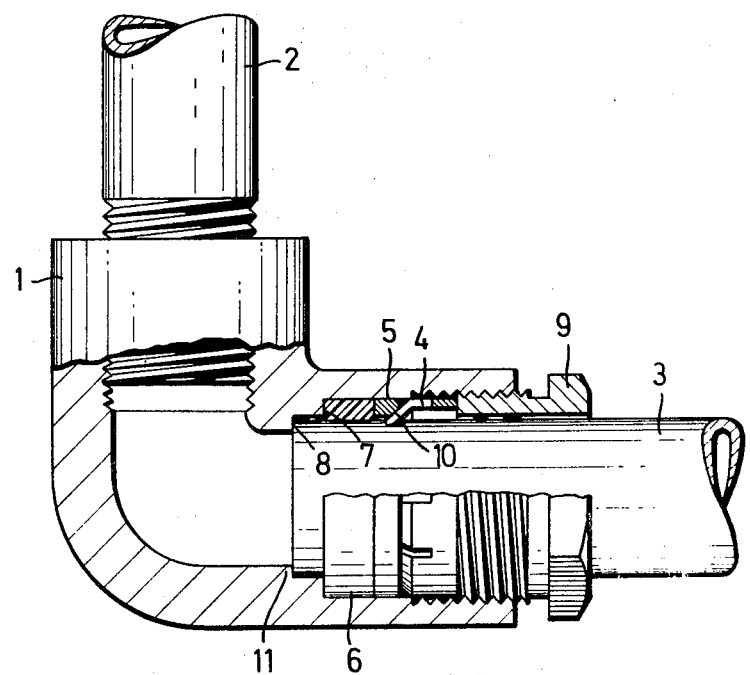

FIGS. 4 and 5 show straight and curved sleeve-like housings in which only one connecting end has the means for clamping a smooth pipe end. The sleeve forms a transition piece between a threaded pipe end and an unthreaded pipe. The supporting surface 7 for the sealing ring is formed by a housing collar. Between the sealing ring and the clamping cap 4, the pressure ring 5 having an inner cone 10 is arranged.

Figure 6:
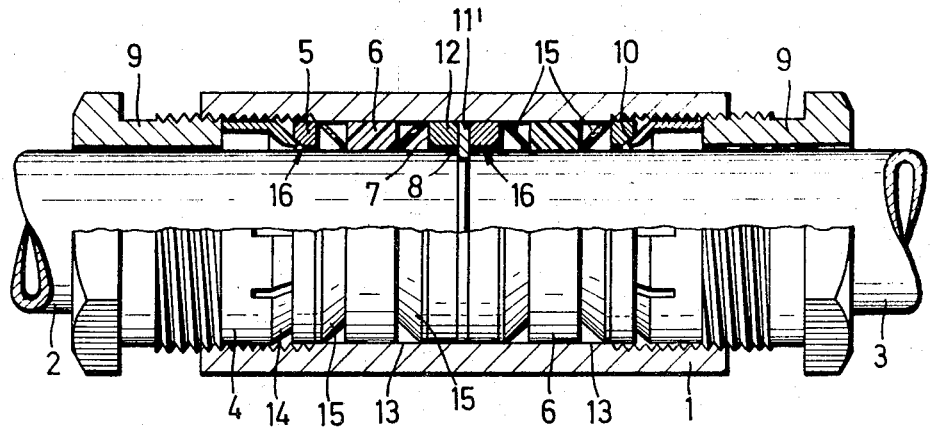

The construction shown in FIG. 6 has in the sleeve-like housing 1 an annular collar 11' which separates two annular spaces 13. On both sides of the collar 11' there are arranged the pressure rings 12 formed of steel or other dimensionally stable metal. Between the pressure rings 12 and the plastic sealing rings 6, as well as behind the pressure rings 5 provided on the outside of the sealing ring, there are arranged thin-walled, deformable annular discs 15 of steel in dish or frustoconical shape. The width of the annular surface (circumferential surface) of these discs 15 is somewhat greater than the radial width of the annular space 13.

Before the clamping of this connection, the annular discs 15 assume an oblique position. In this position, the annular disc can be introduced without difficulty into the annular chamber 13 of the housing 1. This ease of installation is also present with pressure rings 5 and 12 which have a free clearance 16 on the side towards the pipes 2 and 3. Upon the screwing in of the pressure sleeves 9, as a result of the axial thrust simultaneously with the pressing of the sealing ring, the annular discs are brought into a radial position. In this case the discs 15 lie without play, namely first in areal fashion against the face sides of the plastic sealing ring. Furthermore, the edges of the annular discs are pressed against the cylindrical wall surfaces of pipes 2 and 3 and housing 1. The plastic seal is enclosed by these annular discs 15 so that even under high compressive stresses of the sealing ring, the material cannot flow out of the predetermined space. This coupling sleeve has proven dependable in long-term tests.

Figure 7:
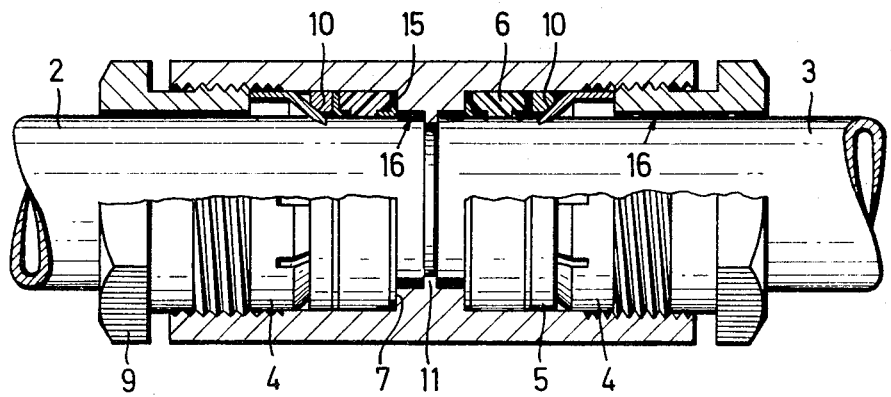

FIG. 7 shows a construction which has a housing collar 11. This collar also has axially offset annular supporting surfaces 7. In this case, the dish-shaped or frustoconically-shaped annular disc 15 associated with the inner front side of the sealing ring 6 rests against the supporting surface 7. The rest of the development corresponds to that of FIG. 6.

While in FIG. 6 the coupling is shown before being clamped, FIG. 7 shows the clamped condition. After the screwing in of the pressure sleeve 9, the annular discs 15 by deformation have grasped the sealing rings on the front side in an armoring-like manner, in which connection, as a result of the initial oblique position, the inner edge regions of the discs grasp below the sealing ring.

The slit clamping caps 4 are so dimensioned that their projections slide more deeply into the corresponding inner cone 10 only after the deformation and firm clamping of the sealing ring, in which connection they are guided in a particularly effective manner by the trapezoidally or similarly shaped pressure rings. The projections of the clamping cap have knife-like edges which, as a result of their hardness, penetrate somewhat into the outer surface of the pipe. This condition corresponds to a mechanical coupling. The sealing rings are in this way secured to their operating condition after clamping has been effected in such a manner that they need not take up any tensile or compressive forces coming from the pipe. The pipe coupling can be loosened in case of need. The clamping caps can be withdrawn from the clamp position by means of a suitable tool.

The coupling sleeves can be delivered completely assembled to the job site, that is, with the sealing and clamping means inserted in their pressure chambers. In this connection, the pressure sleeves 9 are tightened only to such an extent that all the parts contained in the housing 1 rest without play against each other.

In special cases, one can also arrange several sealing rings 6, pressure rings 5, ring bodies 12 and clamping caps 4 one behind the other. One suitable solution is shown in FIGS. 9 and 10. In this case, two clamping caps 4, 4' which are conically tapered in direction of thrust are arranged axially one behind the other detween the sealing ring 6 and the pressure sleeve 9. A pressure ring 5' of steel is provided with an inner cone can be arranged between the two clamping caps. However, the end of the clamping cap 4 could also replace the pressure ring 5' and have an inner cone 10 into which the projections 14 of the clamping cap 4' could be inserted.

Clamping caps 4 and 4', although similar, have a different resistance to deformation. They are positioned in such a manner that the clamping cap 4 which has the lesser resistance to deformation is in each case arranged closer to the sealing ring 6 than the cap 4' which has the greater resistance to deformation. The result is that upon the screwing in of the pressure sleeve 9, the seal is first compressed, whereupon the projections 14 of the clamping cap 4 and only then the projections 14 of the clamping cap 4' are forced into the pipe wall. Three or four clamping caps can also be arranged one behind the other in accordance with the same principle.

What is claimed is:

1. A pipe coupling sleeve having a housing with at least two connecting ends at least one end adapted to clampingly engage an unthreaded smooth pipe including means for sealing and clamping said pipe comprising:
    a. female threads in said housing;
    b. a pressure sleeve having an interior bore to receive said pipe and male threads complementary to said female threads;
    c. an annular stop surface within said housing to limit the axial penetration of said pipe into said housing;
    d. an annular space within the housing between the pressure sleeve and the stop surface, said space containing:
        1. at least one elastic plastic sealing ring;
        2. a clamping cap which is resistant to elastic deformation having an inwardly directed conical end which is slit to form a plurality of projections;
        3. an inner cone; and a frustoconical shaped thin-walled deformable disc positioned at each end of the sealing ring, the width of the annular surface of each of said discs being somewhat greater than the radial width of said housing annular space
    e. said ring, cap discs and cone being arranged with said space so that when the pressure sleeve is screwed into the housing the sealing ring and discs will deform to clamp said pipe and the projections of the cap will be deformed by the cone to engage a pipe inserted therein.

2. The coupling of claim 1 in which one of the frustoconical discs is arranged between the sealing ring and a pressure ring having an approximately trapezoidal cross-section.

3. The coupling of claim 2 in which the other frustoconical disc is clamped between the end of the sealing ring and a pressure ring of approximately square profile.

4. The coupling of claim 1 in which the frustoconical discs are deformable in such a manner that upon screwing in of the pressure sleeve and the inward pushing of the clamping cap, they are pressed into an L-shape against the ends of the sealing ring and against the cylindrical wall surfaces of pipe and housing so as to form a seal.

5. A pipe coupling sleeve having a housing with at least two connecting ends at least one end adapted to clampingly engage an unthreaded smooth pipe including means for sealing and clamping said pipe comprising:
    a. female threads in said housing;
    b. a pressure sleeve having an interior bore to receive said pipe and male threads complementary to said female threads;
    c. an annular stop surface within said housing to limit the axial penetration of said pipe into said housing;
    d. an annular space within the housing between the pressure sleeve and the stop surface, said space containing:
        1. at least one elastic plastic sealing ring;
        2. at least two clamping caps which are resistant to elastic deformation, each cap having an inwardly directed conical end which is slit to form a plurality of projections and a pressure ring between said caps, said pressure ring having an inner cone surface receiving said projections of one of said caps;
        3. an inner cone;
    e. said sealing ring, caps pressure ring and cone being arranged with said space so that when the pressure sleeve is screwed into the housing the sealing ring will deform to clamp said pipe and the projections of the caps will be deformed by the cone and pressure ring cone surface to engage a pipe inserted therein.

6. The coupling of claim 5 in which the clamping cap nearer to the pressure sleeve has a greater resistance to deformation than the other clamping cap.

* * * * *